(12) United States Patent
Jin et al.

(10) Patent No.: US 11,146,317 B2
(45) Date of Patent: Oct. 12, 2021

(54) PRECODING MATRIX INDICATION METHOD, PRECODING MATRIX DETERMINING METHOD, AND DEVICE

(71) Applicant: HUAWEI TECHNOLOGIES CO., LTD., Shenzhen (CN)

(72) Inventors: Huangping Jin, Shanghai (CN); Wei Han, Shanghai (CN); Peng Shang, Shanghai (CN); Peng Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 16/810,750

(22) Filed: Mar. 5, 2020

(65) Prior Publication Data

US 2020/0204229 A1 Jun. 25, 2020

Related U.S. Application Data (63) Continuation of application No. PCT/CN2018/104018, filed on Sep. 4, 2018.

(30) Foreign Application Priority Data

Sep. 7, 2017 (CN) .......................... 201710809550.1

(51) Int. Cl.
*H04B 7/0456* (2017.01)
*H04B 7/0417* (2017.01)
(Continued)

(52) U.S. Cl.
CPC ......... *H04B 7/0469* (2013.01); *H04B 7/0417* (2013.01); *H04B 7/0626* (2013.01); *H04B 7/0634* (2013.01); *H04L 5/0051* (2013.01)

(58) Field of Classification Search
None
See application file for complete search history.

(56) References Cited

U.S. PATENT DOCUMENTS

| 2012/0218948 A1 | 8/2012 | Onggosanusi et al. |
| 2016/0119097 A1* | 4/2016 | Nam ...................... H04L 5/0023 370/329 |

(Continued)

FOREIGN PATENT DOCUMENTS

| CN | 103621000 A | 3/2014 |
| CN | 103795450 A | 5/2014 |

(Continued)

OTHER PUBLICATIONS

Huawei et al: "Design for Type II Feedback", 3GPP Draft; R1-1705076, Apr. 2, 2017 (Apr. 2, 2017), XP051243207, total 12 pages.

(Continued)

*Primary Examiner* — Diane L Lo
(74) *Attorney, Agent, or Firm* — Hauptman Ham, LLP (57) ABSTRACT

A method includes generating, by a processor, first indication information based on N reference signals, where N is an integer and N≥2. The first indication information indicates a plurality of component vectors for constructing a precoding matrix and a superposition coefficient of each component vector of each of M precoding vectors for constructing the precoding matrix upon which a precoding of M reference signals is based, where M is an integer and 1≤M<N. The method also includes transmitting the first indication information by way of an antenna.

12 Claims, 4 Drawing Sheets

(51) Int. Cl.
*H04B 7/06* (2006.01)
*H04L 5/00* (2006.01)

(56) References Cited

U.S. PATENT DOCUMENTS

| | | | |
|---|---|---|---|
| 2017/0099093 A1 | 4/2017 | Zhang et al. | |
| 2017/0272133 A1 | 9/2017 | Chen et al. | |
| 2018/0097553 A1 | 4/2018 | Wang et al. | |
| 2019/0115960 A1 | 4/2019 | Jiang et al. | |
| 2019/0260434 A1* | 8/2019 | Park | H04B 7/0456 |

FOREIGN PATENT DOCUMENTS

| | | |
|---|---|---|
| CN | 104202276 A | 12/2014 |
| CN | 104756427 A | 7/2015 |
| CN | 108418612 A | 8/2018 |
| WO | 2015180178 A1 | 12/2015 |

OTHER PUBLICATIONS

Qualcomm Incorporated: "Discussion on advanced CSI for Class B and hybrid CSI-RS", 3GPP Draft; R1-1702535,Feb. 12, 2017 (Feb. 12, 2017),XP051209689,total 4 pages.
Huawei et al: CSI acqutsition mechantsm for NR DL MIMO, 3GPP Draft; R1-167197,Aug. 21, 2016 (Aug. 21, 2016), XP051140569,total 10 pages.
Extended European search report dated Jun. 12, 2020, from corresponding European application No. 18854734.2.
International search report dated Nov. 27, 2018 from corresponding application No. PCT/CN2018/104018.
Office Action dated Apr. 15, 2020 from corresponding application No. CN 201710809550.1.

* cited by examiner

PRECODING MATRIX INDICATION METHOD, PRECODING MATRIX DETERMINING METHOD, AND DEVICE

CROSS-REFERENCE TO RELATED APPLICATIONS

This application is a continuation of International Application No. PCT/CN2018/104018, filed on Sep. 4, 2018, which claims priority to Chinese Patent Application No. 201710809550.1, filed on Sep. 7, 2017. The disclosures of the aforementioned applications are hereby incorporated by reference in their entireties.

TECHNICAL FIELD

This application relates to the field of communications technologies, and in particular, to a precoding matrix indication method, a precoding matrix determining method, and a device.

BACKGROUND

Emergence of a multiple-input multiple-output (multiple input multiple output, MIMO) technology brings a revolutionary change to wireless communication. A plurality of antennas are deployed on a transmit end device and a receive end device, so that the MIMO technology can significantly improve performance of a wireless communications system. For example, in a diversity scenario, the MIMO technology can effectively improve transmission reliability; in a multiplexing scenario, the MIMO technology can greatly increase transmission throughput.

In a MIMO system, a precoding technology is usually used to improve a channel, to enhance a spatial multiplexing (spatial multiplexing) effect. A problem of massive MIMO is overheads of channel state information-reference signal (channel state information reference signal CSI-RS) resources used during channel measurement. If there are a relatively large quantity of transmit ports on the transmit end device, a relatively large quantity of CSI-RS resources need to be configured during channel measurement.

To resolve the foregoing technical problem, a channel may be measured in a hybrid CSI-RS feedback mode so that CSI that is fed back is used to obtain a precoding vector for precoding data. Specifically, the transmit end device first performs full-channel measurement, and a CSI-RS sent during the full-channel measurement is a CSI-RS that is not precoded. Then, a precoding matrix is determined based on CSI fed back during the full-channel measurement. Then, the CSI-RS is precoded by using the precoding matrix, and local-channel measurement is performed by using the precoded CSI-RS. However, in the technical solution, currently, the precoding matrix for precoding the CSI-RS is determined only by a vector representing direction information of a full channel. Consequently, finally measured accuracy of the precoding vector for precoding the data is relatively low.

SUMMARY

This application provides a precoding matrix indication method, a precoding matrix determining method, and a device, applied to a hybrid CSI feedback mode, so that finally measured accuracy of a precoding vector for precoding data can be improved.

According to a first aspect, this application provides a precoding matrix indication method and apparatus.

In a possible design, the method may include: receiving N reference signals, where N≥2, and N is an integer; then, generating first indication information based on the N reference signals, where the first indication information is used to indicate a plurality of component vectors for constructing a precoding matrix and a superposition coefficient of each component vector of each of M precoding vectors for constructing the precoding matrix, and the precoding matrix is used to precode M reference signals, where 1≤M<N, and M is an integer; and then, sending the first indication information. The method may be executed by a receive end device such as a network device or a terminal. The technical solution may be applied to a first-stage CSI feedback mode in a hybrid CSI feedback mode. In the first-stage CSI feedback mode, indication information of several component vectors and a superposition coefficient of each component vector are fed back, to construct a preceding matrix for precoding a reference signal. Compared with the prior art, not only direction information of a channel matrix that can represent a full channel but also a related superimposition coefficient is fed back. In this way, if the several component vectors are properly set, the constructed precoding matrix is closer to an ideal precoding matrix of the full channel. This helps improve accuracy of the first-stage CSI feedback mode, thereby improving finally measured accuracy of a precoding vector for precoding data.

In another possible design, the method may further include: receiving the M precoded reference signals; then, generating second indication information based on the M reference signals, where the second indication information is used to indicate one or more of the M preceding vectors and a coefficient of each of the one or more precoding vectors, to construct a precoding vector for precoding data; and then sending the second indication information. The technical solution provides an implementation of a second-stage feedback mode. Certainly, this application is not limited thereto.

Correspondingly, this application further provides the precoding matrix indication apparatus. The apparatus may implement the method according to the first aspect. The apparatus may implement the foregoing method by using software or hardware, or by hardware executing corresponding software.

In a possible design, the apparatus may include a processor and a memory. The processor is configured to support the apparatus in executing a corresponding function in the method according to the first aspect. The memory is configured to couple to the processor, and stores a program (instruction) and data that are necessary for the apparatus. In addition, the apparatus may further include a communications interface, configured to support communication between the apparatus and another network element. The communications interface may be a transceiver.

In another possible design, the apparatus may include a transceiver unit and a processing unit. The transceiver unit is configured to receive N reference signals, where N≥2, and N is an integer. The processing unit is configured to generate first indication information based on the N reference signals, where the first indication information is used to indicate a plurality of component vectors for constructing a precoding matrix and a superposition coefficient of each component vector of each of M preceding vectors for constructing the precoding matrix, and the preceding matrix is used to precede M reference signals, where 1≤M<N, and M is an integer. The transceiver unit is further configured to send the first indication information.

In another possible design, the transceiver unit is further configured to receive the M precoded reference signals. The processing unit is further configured to generate second indication information based on the M reference signals, where the second indication information is used to indicate one or more of the M precoding vectors and a coefficient of each of the one or more preceding vectors, to construct a preceding vector for precoding data. The transceiver unit is further configured to send the second indication information.

According to a second aspect, this application provides a preceding matrix determining method and apparatus.

In a possible design, the method may include: sending N reference signals, where N≥2, and N is an integer; receiving first indication information, where the first indication information is used to indicate a plurality of component vectors for constructing a preceding matrix and a superposition coefficient of each component vector of each of M preceding vectors for constructing the precoding matrix, and the preceding matrix is used to precode M reference signals, where 1≤M<N, and M is an integer; and determining the precoding matrix based on the first indication information.

In a possible design, the method may further include: preceding the M reference signals based on the preceding matrix; sending the M preceded reference signals; receiving second indication information, where the second indication information is used to indicate one or more of the M precoding vectors and a coefficient of each of the one or more precoding vectors, to construct a precoding vector for precoding data; and determining, based on the second indication information, the precoding vector for precoding the data.

Correspondingly, this application further provides the precoding matrix determining apparatus. The apparatus may implement the method according to the second aspect. The apparatus may implement the foregoing method by using software or hardware, or by executing corresponding software by hardware.

In a possible design, the apparatus may include a processor and a memory. The processor is configured to support the apparatus in executing a corresponding function in the method according to the second aspect. The memory is configured to couple to the processor, and stores a program (instruction) and data that are necessary for the apparatus. In addition, the apparatus may further include a communications interface, configured to support communication between the apparatus and another network element. The communications interface may be a transceiver.

In another possible design, the apparatus may include a transceiver unit and a processing unit. The transceiver unit is configured to: send N reference signals, where N≥2, and N is an integer; and receive first indication information, where the first indication information is used to indicate a plurality of component vectors for constructing a preceding matrix and a superposition coefficient of each component vector of each of M preceding vectors for constructing the precoding matrix, and the precoding matrix is used to precode M reference signals, where 1≤M<N, and M is an integer. The processing unit is configured to determine the precoding matrix based on the first indication information.

In another possible design, the processing unit is further configured to precode the M reference signals based on the precoding matrix. The transceiver unit is further configured to: send the M precoded reference signals; and receive second indication information, where the second indication information is used to indicate one or more of the M precoding vectors and a coefficient of each of the one or more precoding vectors, to construct a precoding vector for precoding data. The processing unit is further configured to determine, based on the second indication information, the precoding vector for precoding the data.

Based on any method or apparatus provided above, in a possible design, a matrix including superposition coefficients of the component vectors for constructing the precoding matrix is an RX*RL matrix, where R indicates a quantity of polarization directions, X indicates a quantity of component vectors in a single polarization direction, M=RL, and L indicates a quantity of precoding vectors of the precoding matrix in the single polarization direction. Optionally, the matrix is a non-block diagonal matrix. Optionally, the matrix is a block diagonal matrix, where each block is an X*L submatrix. In this way, signaling overheads can be reduced.

According to a third aspect, this application provides a processor. The processor may include:
- at least one circuit, configured to receive N reference signals by using a receiver, where N≥2, and N is an integer;
- at least one circuit, configured to generate first indication information based on the N reference signals, where the first indication information is used to indicate a plurality of component vectors for constructing a precoding matrix and a superposition coefficient of each component vector of each of M precoding vectors for constructing the precoding matrix, and the precoding matrix is used to precode M reference signals, where 1≤M<N, and M is an integer; and
- at least one circuit, configured to send the first indication information by using a transmitter.

In a possible design, the processor may further include:
- at least one circuit, configured to receive the M precoded reference signals by using the receiver:
- at least one circuit, configured to generate second indication information based on the M reference signals, where the second indication information is used to indicate one or more of the M precoding vectors and a coefficient of each of the one or more precoding vectors, to construct a precoding vector for precoding data and
- at least one circuit, configured to send the second indication information by using the transmitter.

The at least one circuit for receiving the N reference signals by using the receiver may be the same as or may be different from the at least one circuit for receiving the M precoded reference signals by using the receiver. The at least one circuit for generating the first indication information may be the same as or may be different from the at least one circuit for generating the second indication information. The at least one circuit for sending the first indication information by using the transmitter may be the same as or may be different from the at least one circuit for sending the second indication information by using the transmitter.

According to a fourth aspect, this application provides a processor. The processor may include:
- at least one circuit, configured to send N reference signals by using a transmitter, where N≥2, and N is an integer:
- at least one circuit, configured to receive first indication information by using a receiver, where the first indication information is used to indicate a plurality of component vectors for constructing a precoding matrix and a superposition coefficient of each component vector of each of M precoding vectors for constructing the precoding matrix, and the precoding matrix is used to precode M reference signals, where 1≤M<N, and M is an integer; and at least one circuit, configured to determine the precoding matrix based on the first indication information.

In a possible design, the processor may further include:

at least one circuit, configured to precode the M reference signals based on the precoding matrix;

at least one circuit, configured to send the M precoded reference signals by using the transmitter;

at least one circuit, configured to receive second indication information by using the receiver, where the second indication information is used to indicate one or more of the M precoding vectors and a coefficient of each of the one or more precoding vectors, to construct a precoding vector for precoding data; and at least one circuit, configured to determine, based on the second indication information, the precoding vector for precoding the data.

The circuits for performing the receiving steps by using the receiver may be the same or may be different. The circuits for performing the sending steps by using the transmitter may be the same or may be different. The circuit for performing the precoding step may be the same as or may be different from the circuits for performing the determining steps.

According to a fifth aspect, this application provides a processing apparatus, including:

a memory; and a processor, configured to read an instruction stored in the memory, to perform the following operations; receiving N reference signals by using a receiver, where N≥2, and N is an integer; generating first indication information based on the N reference signals, where the first indication information is used to indicate a plurality of component vectors for constructing a precoding matrix and a superposition coefficient of each component vector of each of M precoding vectors for constructing the precoding matrix, and the precoding matrix is used to precode M reference signals, where 1≤M<N, and M is an integer; and sending the first indication information by using a transmitter.

In a possible design, the operations may further include: receiving the M precoded reference signals by using the receiver; generating second indication information based on the M reference signals, where the second indication information is used to indicate one or more of the M precoding vectors and a coefficient of each of the one or more precoding vectors, to construct a precoding vector for precoding data; and sending the second indication information by using the transmitter.

According to a sixth aspect, this application provides a processing apparatus, including:

a memory; and a processor, configured to read an instruction stored in the memory, to perform the following operations: sending N reference signals by using a transmitter, where N≥2, and N is an integer; receiving first indication information by using a receiver, there the first indication information is used to indicate a plurality of component vectors for constructing a precoding matrix and a superposition coefficient of each component vector of each of M precoding vectors for constructing the precoding matrix, and the precoding matrix is used to precode M reference signals, where 1≤M<N, and M is an integer; and determining the precoding matrix based on the first indication information.

In a possible design, the operations may further include: precoding the M reference signals based on the precoding matrix; sending the M precoded reference signals by using the transmitter; receiving second indication information by using the receiver, where the second indication information is used to indicate one or more of the M precoding vectors and a coefficient of each of the one or more precoding vectors, to construct a precoding vector for precoding data; and determining, based on the second indication information, the precoding vector for precoding the data.

This application further provides a computer storage medium. The computer storage medium stores a computer program. When the program is run on a computer, the computer is enabled to perform the method according to any one of the foregoing aspects.

This application further provides a computer program product. When the computer program product is run on a computer, the computer is enabled to perform the method according to any one of the foregoing aspects.

This application further provides a communications chip. The communications chip stores an instruction. When the instruction is run on a network device or a terminal, the network device or the terminal is enabled to perform the methods according to the foregoing aspects.

It may be understood that any apparatus, processor, processing apparatus, computer storage medium, or computer program product provided above is configured to perform the corresponding method provided above. Therefore, for a beneficial effect that can be achieved by any apparatus, processor, processing apparatus, computer storage medium, or computer program product provided above, refer to a beneficial effect in the corresponding method. Details are not described herein again.

DESCRIPTION OF EMBODIMENTS

Technical solutions provided in this application may be applied to various communications systems in which a hybrid CSI feedback mode is used, for example, an existing communications system in which the hybrid CSI feedback mode is used, a 5G communications system, a future evolved system, or a plurality of communications convergence systems. A plurality of application scenarios may be included, for example, a machine-to-machine (machine to machine, M2M) scenario, a macro-micro communication scenario, an enhanced mobile broadband (enhance mobile broadband, eMBB) scenario, an ultra-reliable low-latency communication (ultra reliable & low latency communication, uRLLC) scenario, and a massive machine-type communications (massive machine type communication, mMTC) scenario. The scenarios may include but are not limited to a scenario of communication between terminals, a scenario of communication between network devices, a scenario of communication between a network device and a terminal and the like. Alternatively, the technical solutions provided in this application may be applied to a scenario of communication between terminals, a scenario of communication between network devices, and the like in a 5G communications system.

Figure 1:
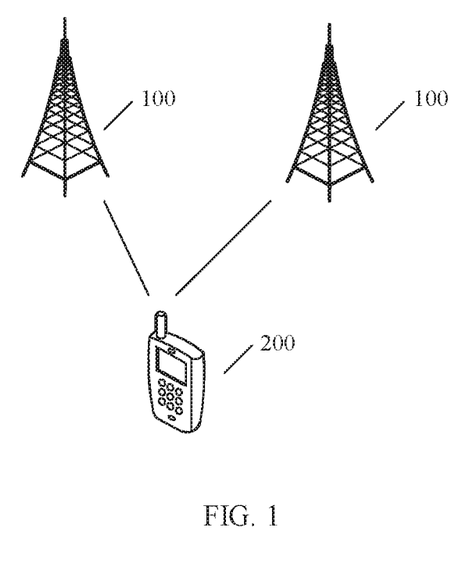
FIG. 1 is a schematic diagram of a communications system to which technical solutions according to embodiments of this application are applicable.

FIG. 1 is a schematic diagram of a communications system to which technical solutions according to this application are applicable. The communications system may include a network device 100 and one or more terminals 200 (only two terminals are shown) connected to the network device 100.

The network device 100 may be a device that can communicate with the terminal 200. The network device 100 may be a transmission node (transmission reference point, TRP), a base station, a relay node, an access point, or the like. The network device 100 may be a base transceiver station (base transceiver station, BTS) in a global system for mobile communications (global system for mobile communication, GSM) or a code division multiple access (code division multiple access, CDMA) network, or may be an NB (NodeB) in wideband code division multiple access (wideband code division multiple access, WCDMA), or may be an eNB or an eNodeB (evolutional NodeB) in LTE. The network device 100 may alternatively be a radio controller in a cloud radio access network (cloud radio access network, CRAN) scenario. The network device 100 may alternatively be a network device in a 5G communications system or a network device in a future evolved network, or may be a wearable device, a vehicle-mounted device, or the like.

The terminal 200 may be user equipment (user equipment, UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal in a future 5G network, a terminal in a future evolved public land mobile network (public land mobile network, PLMN), or the like.

The following describes related technologies and terms in this application, to facilitate understanding of a reader.

In a communication process, a receive end device performs channel measurement based on a reference signal transmitted by a transmit end device, to obtain a channel matrix, determines a precoding vector based on the channel matrix and a base codebook, and feeds back information related to obtaining the precoding vector to the transmit end device (to be specific, CSI feedback). The transmit end device obtains the precoding vector, precodes to-be-transmitted data based on the precoding vector, and sends the precoded data to the receive end device.

The transmit end device is a data sending device, and the receive end device is a data receiving device. In an uplink direction, the transmit end device may be a terminal, and the receive end device may be a network device. In a downlink direction, the transmit end device may be a network device, and the receive end device may be a terminal. The reference signal may be, for example, but is not limited to, a CSI-RS. This is used as an example for description below.

(1) Ideal Precoding Matrix and Ideal Precoding Vector

In a specific implementation process, an ideal precoding vector may be obtained by using a plurality of methods, and ideal precoding vectors obtained by using different methods may be different. For example, the ideal precoding vector may be obtained by performing singular value decomposition (singular value decomposition, SVD) on the channel matrix. Specifically, when singular value decomposition is performed on the channel matrix, the channel matrix may be decomposed into a form of a product of a left unitary matrix, a diagonal matrix, and a right unitary matrix. A conjugate transpose matrix of the right unitary matrix may be used as an ideal precoding matrix, and a column vector of the ideal precoding matrix may be used as the ideal precoding vector. In addition, the ideal precoding matrix obtained based on singular value decomposition may alternatively be obtained by, for example, but not limited to, performing eigenvalue decomposition on a related matrix of the channel matrix. In a specific implementation process, a specific value of and a method for obtaining the ideal precoding vector may be determined based on an overall requirement of a system design. Technical details about the ideal precoding vector are clearly described in the prior art. Details are not described herein again.

(2) Beam Combination (Beam Combination) Technology, Base Codebook, and Component Vector After the foregoing ideal precoding vector is obtained, the ideal precoding vector may be approximately expressed in a form of a weighted sum of a plurality of component vectors, to be specific:

$$P \approx \sum_{i=1}^{m} a_i b_i.$$

P is the ideal precoding vector, $b_i$ is a component vector i, and $a_i$ is a superposition coefficient of the component vector i. In a specific implementation process, a quantity m (m is a positive integer) of the component vectors may be set based on a specific requirement (for example, but not limited to, a requirement on accuracy). For example, the quantity of the component vectors may be a preset quantity.

One component vector corresponds to one beam (beam) direction. The implementation may be referred to as a beam combination technology.

A base codebook is a set of a series of candidate vectors. The component vector is selected from the base codebook. The base codebook may be usually expressed in a form of a matrix. Therefore, the base codebook may also be referred to as a base codebook matrix. The candidate vectors are column vectors of the base codebook matrix. For the base codebook mentioned in this specification, the base codebook may be interchanged with the base codebook matrix if there is no special description or if the interchange does not conflict with an actual function or internal logic of the base codebook in a related description.

The basic codebook matrix includes a plurality of column vectors. Some of the column vectors may be selected as component vectors. There are a plurality of component vector selection methods. An appropriate method may be selected based on a specific requirement. For example, the component vectors may be determined in the plurality of column vectors based on close degrees of the column vectors of the base codebook matrix and the ideal precoding vector, and a plurality of column vectors having first few higher close degrees with the ideal precoding vector may be selected as the component vectors. In a specific implementation process, the close degrees may be specifically reflected as, for example, but is not limited to, inner products of or Euclidean distances between the column vectors of the base codebook matrix and the ideal precoding vector. The inner products are used as an example. When the component vectors are determined, a plurality of column vectors having first few larger inner products (for example, if the inner products are complex numbers, a plurality of column vectors having first few larger amplitudes of the inner products with the ideal precoding vector may be used as the component vectors) with the ideal precoding vector may be used as the component vectors. When there are a plurality of base codebook matrices, the plurality of column vectors may belong to different base codebooks. In addition, an inner product of each component vector and the ideal precoding vector may be further used as a superposition coefficient of the component vector.

In a specific implementation process, when a superposition coefficient is selected from a specific superposition coefficient set, the component vectors and superposition coefficients of the component vectors may also be determined through traversal. For example, if there are four component vectors, any four candidate vectors may be selected from the base codebook matrix as the component vectors, and any four superposition coefficients are selected from the superposition coefficient set as superposition coefficients of the four selected component vectors, to construct a quasi-ideal precoding vector, and the quasi-ideal precoding vector is compared with the channel matrix to determine whether the quasi-ideal precoding vector may be used as the ideal precoding vector. For example, the channel matrix may be precoded by using the quasi-ideal precoding vector, and a channel capacity of the precoded channel matrix is calculated. When the channel capacity is greater than a preset threshold, the quasi-ideal precoding vector is determined as the ideal precoding vector, the candidate vectors are determined as the component vectors, and the superposition coefficients are determined as the superposition coefficients of the component vectors. In addition, a person skilled in the art should understand that the component vectors and the superposition coefficients may alternatively be directly obtained by using the channel matrix, and the ideal precoding vector does not need to be first obtained.

After the component vectors and the superposition coefficients are obtained, a precoding vector can be obtained by performing the foregoing beam combination on the component vectors and the superposition coefficients (to be specific, weighted combination is performed on the component vectors by using the superposition coefficients), to simulate the ideal precoding vector. The transmit end device may directly use the precoding vector to precode a to-be-transmitted signal, or may perform other processing on the precoding vector, and precode the to-be-transmitted signal by using the processed precoding vector. In a specific implementation process, the other processing may be reconstructing the precoding vector, for example, performing orthogonalization processing on precoding vectors of a plurality of users to be scheduled simultaneously. The foregoing content has been clearly described in the prior art. Therefore, details are not described herein again.

It should be noted that in this application, the ideal precoding vector includes, for example, an ideal precoding vector of a full channel and an ideal precoding vector of a local channel. For related descriptions, refer to the following descriptions.

(3) Hybrid CSI Feedback (Hybrid CSI Feedback), First Precoding Matrix, and Second Precoding Matrix.

Transmission of a signal depends on accuracy of CSI. The CSI may include, for example, but is not limited to, at least one of the following a precoding indicator (precoding matrix index, PMI), a rank indicator (rank indication, RI), and the like. CSI feedback in this application is usually PMI feedback.

A basic principle of a hybrid CSI feedback mode is performing full-channel measurement in a long period, and performing local-channel measurement in a short period. The hybrid CSI feedback mode includes a first-stage CSI feedback mode and a second-stage CSI feedback mode. In the first-stage CSI feedback mode, the transmit end device performs full-channel measurement, and a CSI-RS sent during the full-channel measurement is a CSI-RS that is not precoded. In the second-stage CSI feedback mode, the transmit end device performs local-channel measurement, and a CSI-RS sent during the local-channel measurement is a CSI-RS that is not precoded. In addition, in the second-stage CSI feedback mode, in an implementation, a precoding vector used when precoding is performed on a CSI-RS is determined based on CSI fed back in the first-stage CSI feedback mode.

A first precoding matrix is a matrix for precoding a CSI-RS. The first precoding matrix may be obtained by using the CSI fed back in the first-stage CSI feedback mode.

A second precoding matrix is a matrix for precoding data. The second preceding matrix may be obtained by using CSI fed back in the second-stage CSI feedback mode.

Hybrid CSI feedback may be used for channel dimension reduction, to reduce overheads of a reference signal. In this case, a quantity of CSI-RSs in the first-stage CSI feedback mode is greater than a quantity of CSI-RSs in the second-stage CSI feedback mode. An example of the hybrid CSI feedback is as follows: If there are 32 transmit ports and 2 receive ports, a channel matrix H of the full channel is a 2*32 matrix. If an expected quantity of transmit ports is reduced to 8, an expected channel matrix (namely, a channel matrix of the local channel) H' is a 2*8 matrix. Based on this, assuming that $HP_1=H'$, $P_1$ is a 32*8 matrix. It can be learned from this that, the channel matrix H' of the local channel may be obtained by right-multiplying the channel matrix H of the full channel by the matrix $P_1$, thereby implementing dimension reduction of the channel matrix. In other words, in the second-stage CSI feedback mode of the hybrid CSI feedback, the CSI-RS is precoded by using $P_1$.

A hybrid CSI feedback mode defined in R14 is: Class A+Class B K=1. A Class A codebook is configured in the first-stage CSI feedback mode, and a Class B K=1 codebook is configured in the second-stage CSI feedback mode, where K=1 indicates that the quantity of the reference signals configured in the second-stage CSI feedback mode is 1. The Class B K=1 codebook is a port (port) selection codebook To be specific, a transmit port is selected in each polarization direction of transmit ports. An example in which a quantity of polarization directions is 2 is used, and a pair of transmit ports are selected.

In the prior art, for example, the quantity of the polarization directions is 2, and the quantity of the transmit ports is reduced to 2L. In the first-stage CSI feedback mode, information fed back by the receive end device is used to indicate 2L precoding vectors for constructing the first precoding matrix. The precoding vectors may be, for example, but are not limited to, selected from a base codebook set. Each precoding vector corresponds to a beam direction. The first precoding matrix includes matrices including the 2L precoding vectors. In the second-stage CSI feedback mode, information fed back by the receive end device is used to indicate an $l^{th}$ precoding vector selected from the first precoding matrix and a polarization phase difference φ. A precoding vector in the second precoding matrix may be expressed as:

$$P = W^{A-WB} W_1^{B-SB} W_2^{B-SB} = \begin{bmatrix} b_0, b_1, \ldots, b_{L-1} & 0 \\ 0 & b_0, b_1, \ldots, b_{L-1} \end{bmatrix} \begin{bmatrix} e_l & 0 \\ 0 & e_l \end{bmatrix}$$

$$\begin{bmatrix} 1 \\ \phi \end{bmatrix} = \begin{bmatrix} b_l \\ \phi b_l \end{bmatrix}.$$

P indicates the precoding vector in the second precoding matrix. $W^{A-WB}$ indicates a matrix, namely, the first precoding matrix, including precoding vectors in a single polarization direction and indicated in feedback information in the first-stage CSI feedback mode. $W_1^{B-SB}$ indicates a matrix of the $l^{th}$ precoding vector selected from the first precoding matrix. l may be any value in 0 to L−1. $e_l = [0 \ldots 1 \ldots 0]^T$. $e_l$ indicates an L*1 vector in which an $l^{th}$ element is 1, and other elements are all 0. A precoding vector selected based on $e_l$ is a precoding vector indicated in feedback information in the second-stage CSI feedback mode. $W_2^{B-SB}$ indicates a coefficient of the $l^{th}$ precoding vector, for example, may be the polarization phase difference gi.

(4) Other Terms

The term "a plurality of" in this application means two or more. In this specification, the character "/" indicates a "division" relationship between the associated objects. In this application, the terms "first", "second", and the like are intended to distinguish between different objects but do not indicate a particular order of the different objects.

Currently, in the hybrid CSI feedback mode, the first precoding matrix is the matrix including the precoding vectors fed back in the first-stage CSI feedback mode. Consequently, accuracy of the first-stage CSI feedback mode is relatively low, and finally measured accuracy of a precoding vector for precoding data is relatively poor.

Based on this, this application provides a technical solution for indicating a precoding matrix (specifically, the first precoding matrix) and a technical solution for obtaining the precoding matrix, thereby providing an enhanced hybrid CSI feedback mode. With reference to the accompanying drawings and by using the enhanced hybrid CSI feedback mode, the following describes the technical solution for indicating the first precoding matrix and the technical solution for obtaining the first precoding matrix that are provided in this application.

Figure 2:
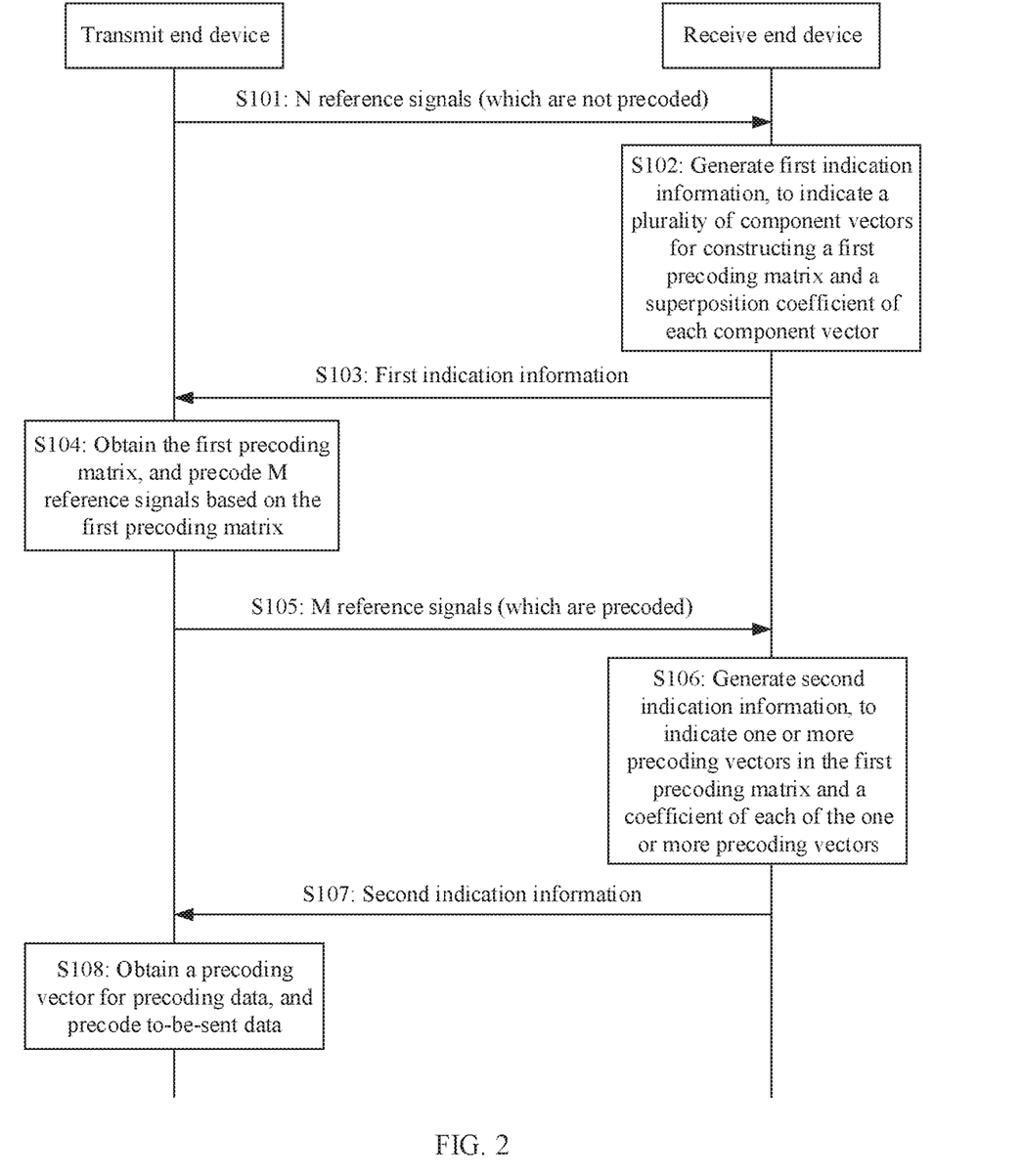
FIG. 2 is a flowchart of an enhanced hybrid CSI feedback mode according to an embodiment of this application.

FIG. 2 is a flowchart of an enhanced hybrid CSI feedback mode according to this application. Details are as follows.

S101: A transmit end device sends N reference signals, where N≥2, and N is an integer, and a receive end device receives the N reference signals, where the N reference signals are reference signals that are not precoded.

The N reference signals may be, for example, but are not limited to, CSI-RSs. The N reference signals correspond to N transmit ports. Each reference signal corresponds to one transmit port. N herein may be a quantity of transmit ports for measuring a full channel. Certainly, this application is not limited thereto.

S102: The receive end device generates first indication information based on the N reference signals, where the first indication information is used to indicate a plurality of component vectors for constructing a first precoding matrix and a superposition coefficient of each component vector of each of M precoding vectors for constructing the first precoding matrix, and the first precoding matrix is used to precode M reference signals, where 1≤M<N, and M is an integer.

The component vectors for constructing the first precoding matrix may be candidate vectors selected from a base codebook. A quantity of component vectors for constructing a precoding matrix is not limited in this application. A larger quantity of the component vectors indicates that the first precoding matrix is closer to an ideal precoding matrix of the full channel. Component vectors of any two precoding vectors for constructing the first precoding matrix may be the same or may be different. For ease of description, the quantity of the component vectors for constructing the first precoding matrix is marked as RX below. R indicates a quantity of polarization directions, R≥1, and R is an integer. X indicates a quantity of component vectors in a single polarization direction, X≥2, and X is an integer. Generally, component vectors in different polarization directions may be the same or may be different. For example, assuming that X=4, component vectors in any polarization direction may be $b_1$ to $b_4$.

The first precoding matrix may include the M precoding vectors, or may include several precoding vectors other than the M precoding vectors. An example in which the first precoding matrix includes the M precoding vectors is used for description below. Based on this, the first precoding matrix is an N*M matrix, namely, an N*RL matrix. M=RL, and L indicates a quantity of precoding vectors in the single polarization direction in the first precoding matrix.

In some implementations, for any preceding vector, superposition coefficients of the plurality of component vectors for constructing the precoding vector may be normalized, and a superposition coefficient of a component vector that is used as a normalized reference is 0. Therefore, in a specific implementation process, the superposition coefficient of the component vector that is used as the normalized reference may not be transmitted. In this case, for any preceding vector in the first preceding matrix, the superposition coefficient of each component vector in S102 is a superposition coefficient of a component vector that is not used as the normalized reference when the preceding vector is constructed.

S103: The receive end device sends the first indication information, and the transmit end device receives the first indication information.

The first indication information may be a precoding vector indicator (precoding matrix indicator, PMI) or may be other information. The first indication information may be carried in one or more messages in the prior art and sent by the receive end device to the transmit end device. Certainly, this application is not limited thereto.

It may be considered that first-stage CSI feedback ends hereto.

S104: The transmit end device obtains the first precoding matrix based on the first indication information, and precodes the M reference signals based on the first precoding matrix.

The M reference signals may be unrelated to the N reference signals, or certainly may be M of the N reference signals. M may be greater than N, or may be equal to N, or may be less than N.

The transmit end device may directly use the first precoding matrix to precode the M reference signals. In addition, in addition to directly using the first precoding matrix obtained based on the foregoing process to precode a reference signal, the transmit end device may further reconstruct the first precoding matrix of each to-be-scheduled receive end device, and use the reconstructed precoding matrix to perform precoding, for example, may reconstruct the first precoding matrix in a multi-user MIMO (multi-user MIMO, MU-MIMO) scenario. A reconstruction process may be performed based on a plurality of algorithms, for example, but not limited to any one of the following algorithms: a zero forcing (zero forcing, ZF) algorithm, a minimum mean square error (minimum mean square error, MMSE) algorithm, a block diagonalization (block diagonalization, BD) algorithm, and the like.

S105: The transmit end device sends the M precoded reference signals, and the receive end device receives the M precoded reference signals.

S106: The receive end device generates second indication information based on the M precoded reference signals, where the second indication information is used to indicate one or more precoding vectors in the first precoding matrix and a coefficient of each of the one or more precoding vectors, and information indicated by the second indication information is used to construct a precoding vector for precoding data, namely, a precoding vector in a second precoding matrix.

The precoding vector indicated by the second indication information is selected from the first precoding matrix. A specific selection manner is not limited in this application. For example, refer to the prior art. A quantity of precoding vectors from the first precoding matrix that are used to construct any precoding vector in the second precoding matrix is not limited in this application. A larger quantity of the precoding vectors from the first precoding matrix indicates that the constructed precoding vector in the second precoding matrix is closer to an ideal precoding vector of a local channel.

If the second indication information is used to indicate a precoding vector in the first precoding matrix, a coefficient of the precoding vector may include a polarization phase difference. If the second indication information is used to indicate a plurality of precoding vectors in the first precoding matrix, a coefficient of the precoding vector may also be referred to as a superposition coefficient of the precoding vector, may specifically include a wideband superposition coefficient, and further may include a narrowband superposition coefficient.

For any precoding vector in the second precoding matrix, superposition coefficients of the plurality of precoding vectors from the first precoding matrix that construct the precoding vector may be normalized, and a superposition coefficient of the precoding vector that is used as a normalized reference is 0. Therefore, in a specific implementation process, the superposition coefficient of the precoding vector that is used as the normalized reference may not be transmitted. In this case, for any precoding vector in the second precoding matrix, the superposition coefficient of each precoding vector in S106 is a superposition coefficient of a precoding vector that is not used as the normalized reference.

The second indication information may be a PMI or may be other information. The second indication information may be carried in one or more messages in the prior art and sent by the receive end device to the transmit end device. Certainly, this application is not limited thereto.

S107: The receive end device sends the second indication information, and the transmit end device receives the second indication information.

It may be considered that second-stage CSI feedback ends hereto.

S108: The transmit end device obtains, based on the second indication information, the precoding vector for precoding the data, and may subsequently precode to-be-sent data based on the precoding vector.

The transmit end device may obtain, based on the first indication information and the second indication information, the precoding vector for precoding the data. For a specific implementation process, refer to the following descriptions. In addition, the transmit end device may obtain, according to the method of S106 to S108, a plurality of precoding vectors for precoding data, constitute a precoding matrix (namely, the second precoding matrix) by using the plurality of precoding vectors, and then precode the to-be-sent data based on the precoding matrix.

In the technical solution provided in this embodiment of this application, in a first-stage CSI feedback mode, indication information of several component vectors and a superposition coefficient of each component vector are fed back, to construct a precoding matrix for precoding a reference signal. Compared with the prior art, not only direction information of a channel matrix that can represent a full channel but also a related superimposition coefficient is fed back. In this way, if the several component vectors are properly set (for example, a quantity of the component vectors is increased, or a proper component vector selected method is used), the constructed precoding matrix is closer to an ideal precoding matrix of the full channel. This helps improve accuracy of the first-stage CSI feedback mode, thereby improving finally measured accuracy of a precoding vector for precoding data.

This application further provides several structures of the first precoding matrix. It should be noted that for ease of description, the following uses an example in which a quantity R of polarization directions is 2 for description. A person skilled in the art can properly deduce, without creative efforts, a specific implementation when the quantity R of the polarization directions is another value.

A first structure is that the first precoding matrix is a non-block diagonal matrix. An example in which the quantity R of the polarization directions is 2 is used, and the first precoding matrix may be expressed as:

$$P_1 = [c_0, c_1, \ldots, c_{2L-1}].$$

$P_1$ indicates the first precoding matrix. $c_i$ indicates an $i^{th}$ precoding vector in the first precoding matrix, $0 \leq i \leq 2L-1$, and i is an integer. In this case, a quantity of elements of $c_i$ is N.

A second structure is that the first precoding matrix is a block diagonal matrix, where each block is an N*L submatrix. An example in which the quantity R of the polarization directions is 2 is used, and the first precoding matrix may be expressed as:

$$P_1 = \begin{bmatrix} c_0, c_1, \ldots, c_{L-1} & 0 \\ 0 & c_0, c_1, \ldots, c_{L-1} \end{bmatrix}.$$

$P_1$ indicates the first precoding matrix. $c_i$ indicates an $i^{th}$ precoding vector in the first precoding matrix in a single polarization direction, $0 \leq i \leq L-1$, and i is an integer.

In this case, a quantity of elements of $c_i$ is $$\frac{N}{2}.$$

In this application, the first precoding matrix may be, for example, but is not limited to, expressed in the foregoing two forms. In addition, information fed back in the first-stage CSI feedback mode is used to indicate 2× component vectors for constructing the first precoding matrix, and a superposition coefficient of each component vector for constructing each precoding vector in the first precoding matrix. In this application, the first precoding matrix may be constructed by using any method for determining, based on the beam combination technology, a precoding matrix for decoding data in the prior art. Details are not described herein again. A value relationship between X and L is not limited in this application. X may be greater than L, or may be less than L, or may be equal to L.

This application further provides a structure of a matrix including superposition coefficients of component vectors. The following describes, by using a specific structure of the first precoding matrix, the structure, provided in this application, of the matrix including the superposition coefficients of the component vectors.

1. When the first precoding matrix is of the foregoing first structure, the first preceding matrix may be specifically expressed as:

$$P_1 = W_1^{A-WB} W_2^{A-WB} = \begin{bmatrix} b_0, b_1, \ldots, b_{X-1} & 0 \\ 0 & b_0, b_1, \ldots, b_{X-1} \end{bmatrix}$$

$$\begin{bmatrix} \alpha_{0,0} & \alpha_{0,1} & \cdots & \alpha_{0,2L-1} \\ \alpha_{1,0} & \alpha_{1,1} & \cdots & \alpha_{1,2L-1} \\ \vdots & \vdots & \ddots & \vdots \\ \alpha_{2X-1,0} & \alpha_{2X-1,1} & \cdots & \alpha_{2X-1,2L-1} \end{bmatrix}.$$

$W_1^{A-WB}$ indicates a matrix including component vectors indicated by first indication information, namely, a matrix including component vectors indicated in the feedback information in the first-stage CSI feedback mode. $W_2^{A-WB}$ indicates a matrix formed by superimposition coefficients of the component vectors indicated by the first indication information, namely, a matrix including superimposition coefficients of the component vectors indicated in the feedback information in the first-stage CSI feedback mode, and each element in $W_2^{A-WB}$ indicates a superimposition coefficient.

It should be noted that when the first precoding matrix is of the foregoing first structure, the matrix including the superposition coefficients of the component vectors indicated by the first indication information may be a non-block diagonal matrix.

In this case, if second indication information indicates one precoding vector in the first precoding matrix, the precoding vector in the second precoding matrix may be expressed as:

$$P =$$

$$W_1^{A-WB} W_2^{A-WB} W_1^{B-SB} W_2^{B-SB} = \begin{bmatrix} b_0, b_1, \ldots, b_{X-1} & 0 \\ 0 & b_0, b_1, \ldots, b_{X-1} \end{bmatrix}$$

$$\begin{bmatrix} \alpha_{0,0} & \alpha_{0,1} & \cdots & \alpha_{0,2L-1} \\ \alpha_{1,0} & \alpha_{1,1} & \cdots & \alpha_{1,2L-1} \\ \vdots & \vdots & \ddots & \vdots \\ \alpha_{2X-1,0} & \alpha_{2X-1,1} & \cdots & \alpha_{2X-1,2L-1} \end{bmatrix}$$

$$\begin{bmatrix} e_l & 0 \\ 0 & e_l \end{bmatrix} \begin{bmatrix} 1 \\ \phi \end{bmatrix} = \begin{bmatrix} \sum_{i=0}^{X-1} \alpha_{i,l} b_i + \phi \sum_{i=0}^{X-1} \alpha_{i,l+L} b_i \\ \sum_{i=X}^{2X-1} \alpha_{i,l} b_{i-X} + \phi \sum_{i=X}^{2X-1} \alpha_{i,l+L} b_{i-X} \end{bmatrix}.$$

For explanation of related parameters in the formula, refer to the foregoing descriptions. Details are not described herein again.

In this case, if the second indication information indicates a plurality of precoding vector in the first precoding matrix, the precoding vector in the second precoding matrix may be expressed as:

$$P =$$

$$W_1^{A-WB} W_2^{A-WB} W_1^{B-WB} W_2^{B-SB} = \begin{bmatrix} b_0, b_1, \ldots, b_{X-1} & 0 \\ 0 & b_0, b_1, \ldots, b_{X-1} \end{bmatrix}$$

$$\begin{bmatrix} \alpha_{0,0} & \alpha_{0,1} & \cdots & \alpha_{0,2L-1} \\ \alpha_{1,0} & \alpha_{1,1} & \cdots & \alpha_{1,2L-1} \\ \vdots & \vdots & \ddots & \vdots \\ \alpha_{2X-1,0} & \alpha_{2X-1,1} & \cdots & \alpha_{2X-1,2L-1} \end{bmatrix}$$

$$\begin{bmatrix} e_{\Psi(0)}, e_{\Psi(1)}, \ldots, e_{\Psi(Y)} & 0 \\ 0 & e_{\Psi(0)}, e_{\Psi(1)}, \ldots, e_{\Psi(Y)} \end{bmatrix}$$

$$\begin{bmatrix} \rho_{0,0} & \rho_{0,1} & \cdots & \rho_{0,R-1} \\ \rho_{1,0} & \rho_{1,1} & \cdots & \rho_{1,R-1} \\ \vdots & \vdots & \ddots & \vdots \\ \rho_{2Y-1,0} & \rho_{2Y-1,1} & \cdots & \rho_{2Y-1,R-1} \end{bmatrix}.$$

An $r^{th}$ column of P is:

$$\begin{bmatrix} \sum_{y=0}^{Y-1} \rho_{y,r} \sum_{i=0}^{X-1} \alpha_{i,\Psi(y)} b_i + \sum_{y=Y}^{2Y-1} \rho_{y,r} \sum_{i=0}^{X-1} \alpha_{i,\Psi(y-Y)+L} b_i \\ \sum_{y=0}^{Y-1} \rho_{y,r} \sum_{i=X}^{2X-1} \alpha_{i,\Psi(y)} b_{i-X} + \sum_{y=Y}^{2Y-1} \rho_{y,r} \sum_{i=X}^{2X-1} \alpha_{i,\Psi(y-Y)+L} b_{i-X} \end{bmatrix},$$

where $1 \leq r \leq R$, and r is an integer.

For explanation of related parameters in the formula, refer to the foregoing descriptions. Details are not described herein again. It should be noted that in this formula, $W_1^{B-WB}$ indicates Y precoding vectors selected from the first precoding matrix, $2 \leq Y \leq L$, and Y is an integer. $e_{\Psi(y)}$ indicates an L*1 vector in which a $y^{th}$ element is 1, and other elements are all 0. $0 \leq y \leq Y-1$. R indicates a rank of a channel. $W_2^{B-SB}$ indicates a matrix including superposition coefficients of the Y precoding vectors selected from the first precoding matrix. Each element in $W_2^{B-SB}$ indicates one superposition coefficient.

2. When the first preceding matrix is of the foregoing second structure, the first precoding matrix may be specifically expressed as:

$$P_1 = \begin{bmatrix} b_0, b_1, \ldots, b_{X-1} & 0 \\ 0 & b_0, b_1, \ldots, b_{X-1} \end{bmatrix}$$

-continued $$\begin{bmatrix} \alpha_{0,0} & \cdots & \alpha_{0,L-1} & & & \\ \vdots & \ddots & \vdots & & 0 & \\ \alpha_{X-1,0} & \cdots & \alpha_{X-1,L-1} & & & \\ & & & \beta_{0,0} & \cdots & \beta_{0,L-1} \\ & 0 & & \vdots & \ddots & \vdots \\ & & & \beta_{X-1,0} & \cdots & \beta_{X-1,L-1} \end{bmatrix}.$$

For explanation of related parameters in the formula, refer to the foregoing descriptions. Details are not described herein again.

It should be noted that when the first precoding matrix is expressed in the second structure, a matrix including superposition coefficients of component vectors indicated by first indication information is a block diagonal matrix, and each block is an X*L submatrix. In addition, in a specific implementation process, only a superposition coefficient indicated by each element in each submatrix needs to be transmitted in the first indication information. In this way, signaling overheads can be reduced.

In this case, if second indication information indicates one precoding vector in the first precoding matrix, the precoding vector in the second precoding matrix may be expressed as:

$$P = $$

$$W_1^{A-WB} W_2^{A-WB} W_1^{B-SB} W_2^{B-SB} = \begin{bmatrix} b_0, b_1, \ldots, b_{X-1} & 0 \\ 0 & b_0, b_1, \ldots, b_{X-1} \end{bmatrix}$$

$$\begin{bmatrix} \alpha_{0,0} & \cdots & \alpha_{0,L-1} & & & \\ \vdots & \ddots & \vdots & & 0 & \\ \alpha_{X-1,0} & \cdots & \alpha_{X-1,L-1} & & & \\ & & & \beta_{0,0} & \cdots & \beta_{0,L-1} \\ & 0 & & \vdots & \ddots & \vdots \\ & & & \beta_{X-1,0} & \cdots & \beta_{X-1,L-1} \end{bmatrix}$$

$$\begin{bmatrix} e_t & 0 \\ 0 & e_t \end{bmatrix} \begin{bmatrix} 1 \\ \phi \end{bmatrix} = \begin{bmatrix} \sum_{i=0}^{X-1} \alpha_{i,t} b_i \\ \phi \sum_{i=X}^{X-1} \beta_{i,t} b_i \end{bmatrix}.$$

For explanation of related parameters in the formula, refer to the foregoing descriptions. Details are not described herein again.

In this case, if the second indication information indicates a plurality of precoding vector in the first precoding matrix, the precoding vector in the second precoding matrix may be expressed as:

$$P = $$

$$W_1^{A-WB} W_2^{A-WB} W_1^{B-WB} W_2^{B-SB} = \begin{bmatrix} b_0, b_1, \ldots, b_{X-1} & 0 \\ 0 & b_0, b_1, \ldots, b_{X-1} \end{bmatrix}$$

$$\begin{bmatrix} \alpha_{0,0} & \cdots & \alpha_{0,L-1} & & & \\ \vdots & \ddots & \vdots & & 0 & \\ \alpha_{X-1,0} & \cdots & \alpha_{X-1,L-1} & & & \\ & & & \beta_{0,0} & \cdots & \beta_{0,L-1} \\ & 0 & & \vdots & \ddots & \vdots \\ & & & \beta_{X-1,0} & \cdots & \beta_{X-1,L-1} \end{bmatrix}$$

$$\begin{bmatrix} e_{\Psi(0)}, e_{\Psi(1)}, \ldots, e_{\Psi(Y)} & 0 \\ 0 & e_{\Psi(0)}, e_{\Psi(1)}, \ldots, e_{\Psi(Y)} \end{bmatrix}$$

$$\begin{bmatrix} \rho_{0,0} & \rho_{0,1} & \cdots & \rho_{0,R-1} \\ \rho_{1,0} & \rho_{1,1} & \cdots & \rho_{1,R-1} \\ \vdots & \vdots & \ddots & \vdots \\ \rho_{2Y-1,0} & \rho_{2Y-1,1} & \cdots & \rho_{2Y-1,R-1} \end{bmatrix}.$$

An $r^{th}$ column of P is:

$$\begin{bmatrix} \sum_{y=0}^{Y-1} \rho_{y,r} \sum_{i=0}^{X-1} \alpha_{i,\Psi(y)} b_i \\ \sum_{y=Y}^{2Y-1} \rho_{y,r} \sum_{i=0}^{X-1} \beta_{i,\Psi(y-Y)+L} b_i \end{bmatrix},$$

$1 \leq r \leq R$, and r is an integer.

For explanation of related parameters in the formula, refer to the foregoing descriptions. Details are not described herein again.

The solutions provided in the embodiments of this application are mainly described from a perspective of interaction between network elements. It may be understood that each network element is, for example, a network device or a terminal. To implement the foregoing functions, corresponding hardware structures and/or software modules for performing the functions are included. A person skilled in the art should easily be aware that in combination with the examples described in the embodiments disclosed in this specification, units, algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, functional modules of the network device or the terminal may be divided based on the foregoing method example. For example, each function module may be obtained through division based on a corresponding function, or two or more functions may be integrated into one processing module. The integrated module may be implemented in a form of hardware, or may be implemented in a form of a software functional module. It should be noted that in this embodiment of this application, division into the modules is an example, and is merely a logical function division, and may be other division in an actual implementation. The following performs description by using an example in which each function module is obtained through division based on each corresponding function.

Figure 3:
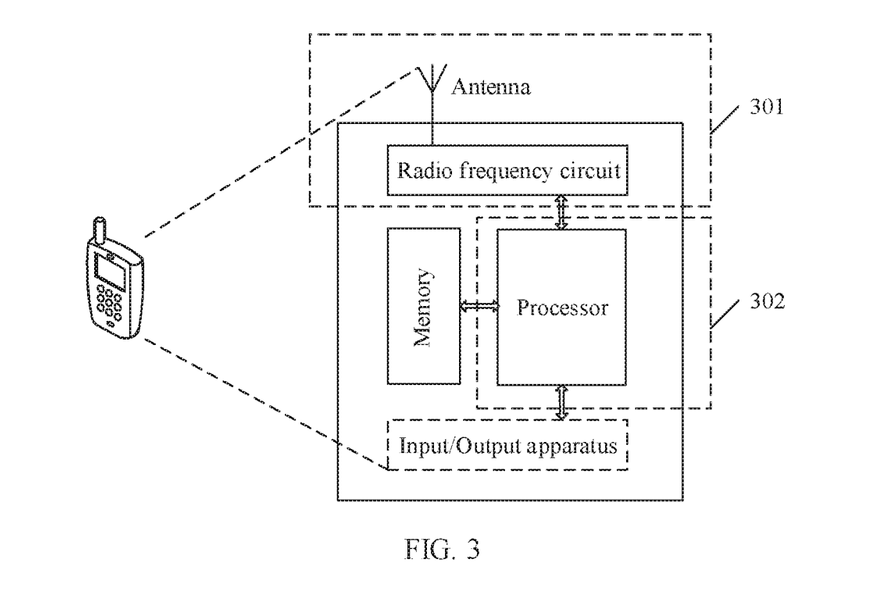
FIG. 3 is a schematic structural diagram of a terminal according to an embodiment of this application.

An embodiment of this application further provides a terminal. In a downlink direction, the terminal may be configured to perform the steps performed by the receive end device in FIG. 2. In an uplink direction, the terminal may be configured to perform the steps performed by the transmit end device in FIG. 2. FIG. 3 is a simplified schematic structural diagram of a terminal. For ease of understanding and convenience of figure illustration, an example in which the terminal is a mobile phone is used in FIG. 3. As shown in FIG. 3, the terminal includes a processor, a memory, a radio frequency circuit, an antenna, and an input/output apparatus. The processor is mainly configured to: process a communication protocol and communication data, control the terminal, execute a software program, process data of a software program, and so on. The memory is mainly configured to store the software program and data. The radio frequency circuit is mainly configured to perform conversion between a baseband signal and a radio frequency signal, and process the radio frequency signal. The antenna is mainly configured to transmit and receive a radio frequency signal in an electromagnetic wave form. The input/output apparatus such as a touchscreen, a display screen, or a keyboard is mainly configured to receive data entered by a user, and data output to the user. It should be noted that some types of terminals may not have an input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form by using the antenna. When data is sent to the terminal, the radio frequency circuit receives the radio frequency signal by using the antenna, converts the radio frequency signal into the baseband signal, and outputs the baseband signal to the processor. The processor converts the baseband signal into data, and processes the data. For ease of description, FIG. 3 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal, and the processor that has a processing function may be considered as a processing unit of the terminal. As shown in FIG. 3, the terminal includes a transceiver unit 301 and a processing unit 302. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 301 and that is configured to implement a receiving function may be considered as a receiving unit, and a component that is in the transceiver unit 301 and that is configured to implement a sending function may be considered as a sending unit. To be specific, the transceiver unit 301 includes the receiving unit and the sending unit. The transceiver unit sometimes may also be referred to as a transceiver, a transceiver, a transceiver circuit, or the like. The receiving unit sometimes may also be referred to as a receiver, a receiver, a receiving circuit, or the like. The sending unit sometimes may also be referred to as a transmitter, a transmitter, a transmitter circuit, or the like.

For example, in an implementation, in a downlink direction, the transceiver unit 301 is configured to perform the step performed by the receive end device in S101, S103, S105, and/or S107 in FIG. 2 and/or other steps in this application. The processing unit 302 is configured to perform S102 and/or S106 in FIG. 2, and/or other steps in this application.

For another example, in an implementation, in an uplink direction, the transceiver unit 301 is configured to perform the step performed by the transmit end device in S101. S103, S105, and/or S107 in FIG. 2 and/or other steps in this application. The processing unit 302 is configured to perform S104 and/or S108 in FIG. 2, and/or other steps in this application.

Figure 4:
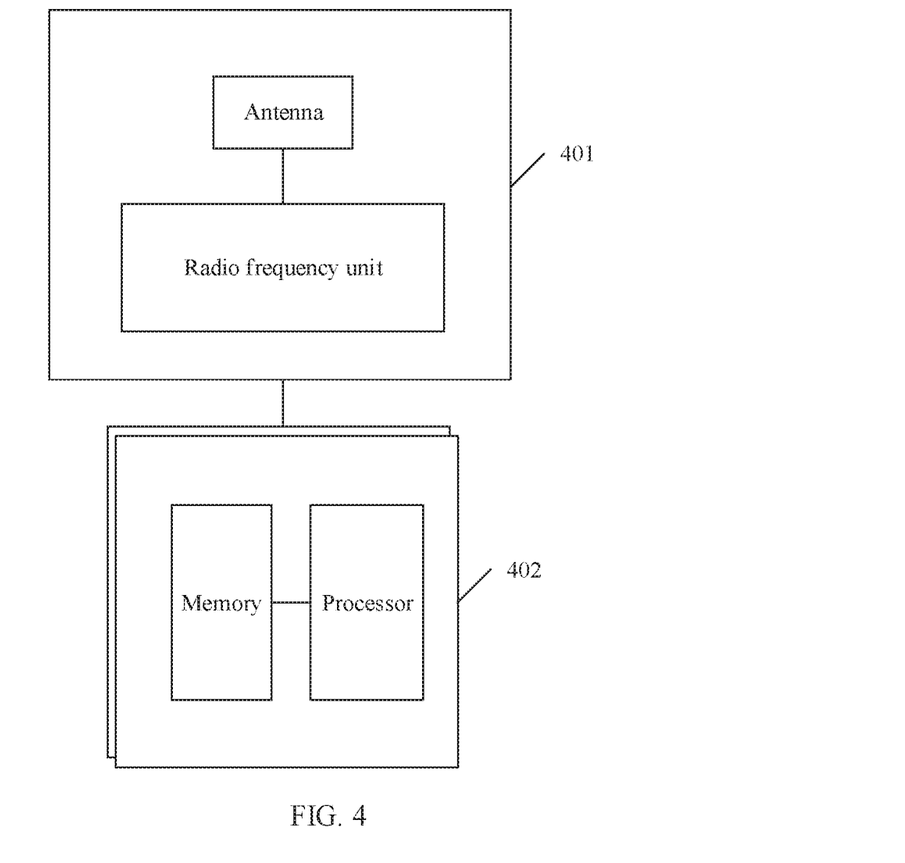
FIG. 4 is a schematic structural diagram of a network device according to an embodiment of this application.

Embodiments of this application further provides a network device such as a base station. FIG. 4 is a simplified schematic structural diagram of a base station network device. The base station network device includes a part 401 and a part 402. The part 401 is mainly configured to send and receive a radio frequency signal and perform conversion between a radio frequency signal and a baseband signal. The part 402 is mainly configured to perform baseband processing, control the base station network device, and so on. The part 401 may be usually referred to as a transceiver unit, a transceiver, a transceiver circuit, a transceiver, or the like. The part 402 is usually a control center of the base station network device, and may be usually referred to as a processing unit, configured to control the base station network device to perform steps performed by the base station network device (namely, serving base station network device) in FIG. 4. For details, refer to descriptions of the foregoing related parts.

The transceiver unit in the part 401 may also be referred to as a transceiver, a transceiver, or the like, and includes an antenna and a radio frequency unit. The radio frequency unit is mainly configured to perform radio frequency processing. Optionally, a component that is in the part 401 and that is configured to implement a receiving function may be considered as a receiving unit, and a component that is configured to implement a sending function may be considered as a sending unit. To be specific, the part 401 includes the receiving unit and the sending unit. The receiving unit may also be referred to as a receiver, a receiver, a receiver circuit, or the like. The sending unit may be referred to as a transmitter, a transmitter, a transmitter circuit, or the like.

The part 402 may include one or more boards. Each board may include one or more processors and one or more memories, and the processor is configured to read and execute a program in the memory, to implement a baseband processing function and control the base station. If there are a plurality of boards, the boards may be interconnected to improve a processing capability. In an optional implementation, a plurality of boards may share one or more processors, or a plurality of boards may share one or more memories, or a plurality of boards may simultaneously share one or more processors.

For example, in an implementation, in a downlink direction, a transceiver unit 301 is configured to perform the step performed by the transmit end device in S101, S103, S105, and/or S107 in FIG. 2 and/or other steps in this application. A processing unit 302 is configured to perform S104 and/or S108 in FIG. 2, and/or other steps in this application.

For another example, in an implementation, in an uplink direction, the transceiver unit 301 is configured to perform the step performed by the receive end device in S101, S103, S105, and/or S107 in FIG. 2 and/or other steps in this application. The processing unit 302 is configured to perform S102 and/or S106 in FIG. 2, and/or other steps in this application.

For explanations and beneficial effects of related content in any apparatus provided above, refer to the corresponding method embodiments provided in the foregoing description. Details are not described herein again.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line. DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims. "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of the following claims of this application and their equivalent technologies.

What is claimed is:

1. A method, comprising:
   generating, by a processor, first indication information based on N reference signals, where N is an integer and N≥2, wherein the first indication information indicates a plurality of component vectors for constructing a precoding matrix and a superposition coefficient of each component vector of each of M precoding vectors for constructing the precoding matrix upon which a precoding of M reference signals is based, where M is an integer and 1≤M<N; and
   transmitting the first indication information by way of an antenna.

2. The method according to claim 1, wherein the precoding matrix is a first precoding matrix, the M precoding vectors are M first precoding vectors and the method further comprises:
   generating second indication information based on the M reference signals, wherein the second indication information indicates one or more of the M first precoding vectors and a coefficient of each of the one or more M first precoding vectors, to construct a second precoding vector for inclusion in a second precoding matrix; and
   transmitting the second indication information by way of the antenna.

3. The method according to claim 1, wherein a matrix comprising the superposition coefficients of the component vectors for constructing the precoding matrix is an RX*RL matrix, where R indicates a quantity of polarization directions, X indicates a quantity of component vectors in a single polarization direction, M=RL, and L indicates a quantity of precoding vectors of the precoding matrix in the single polarization direction; and
   the matrix is a block diagonal matrix, wherein each block is an X*L submatrix.

4. The method according to claim 1, wherein a matrix comprising the superposition coefficients of the component vectors for constructing the precoding matrix is an RX*RL matrix, where R indicates a quantity of polarization directions, X indicates a quantity of component vectors in a single polarization direction, M=RL, and L indicates a quantity of precoding vectors of the precoding matrix in the single polarization direction; and
   the matrix is a non-block diagonal matrix.

5. A method, comprising:
   transmitting N reference signals by way of an antenna, where N is an integer and N≥2; and
   generating, by a processor, a precoding matrix based on first indication information indicating a plurality of component vectors for constructing the precoding matrix and a superposition coefficient of each component vector of each of M precoding vectors for constructing the precoding matrix upon which a precoding of M reference signals is based, where M is an integer and 1≤M<N.

6. The method according to claim 5, wherein the precoding matrix is a first precoding matrix, the M precoding vectors are M first precoding vectors and the method further comprises:
   precoding the M reference signals based on the first precoding matrix;
   transmitting the M reference signals by way of the antenna; and
   generating a second precoding vector based on second indication information, wherein the second indication information indicates one or more of the M first precoding vectors and a coefficient of each of the one or more M first precoding vectors, to construct the second precoding vector for inclusion in a second precoding matrix.

7. The method according to claim 5, wherein a matrix comprising the superposition coefficients of the component vectors for constructing the precoding matrix is an RX*RL matrix, where R indicates a quantity of polarization directions, X indicates a quantity of component vectors in a single polarization direction, M=RL, and L indicates a quantity of precoding vectors of the precoding matrix in the single polarization direction; and the matrix is a block diagonal matrix, wherein each block is an X*L submatrix.

8. The method according to claim 5, wherein a matrix comprising the superposition coefficients of the component vectors for constructing the precoding matrix is an RX*RL matrix, where R indicates a quantity of polarization directions, X indicates a quantity of component vectors in a single polarization direction, M=RL, and L indicates a quantity of precoding vectors of the precoding matrix in the single polarization direction; and the matrix is a non-block diagonal matrix.

9. A transmit end device, comprising:
at least one processor;
a memory having computer-readable instructions stored thereon that, when executed by the at least one processor, cause the transmit end device to:
generate, first indication information based on N reference signals, where N is an integer and N≥2, wherein the first indication information indicates a plurality of component vectors for constructing a precoding matrix and a superposition coefficient of each component vector of each of M precoding vectors for constructing the precoding matrix upon which a precoding of M reference signals is based, where M is an integer and 1≤M<N; and transmit the first indication information by way of the antenna.

10. The transmit end device according to claim 9, wherein the precoding matrix is a first precoding matrix, the M precoding vectors are M first precoding vectors and the transmit end device is further caused to:
generate second indication information based on the M reference signals, wherein the second indication information indicates one or more of the M first precoding vectors and a coefficient of each of the one or more M first precoding vectors, to construct a second precoding vector for inclusion in a second precoding matrix; and
transmit the second indication information by way of the antenna.

11. The transmit end device according to claim 9, wherein a matrix comprising the superposition coefficients of the component vectors for constructing the precoding matrix is an RX*RL matrix, where R indicates a quantity of polarization directions, X indicates a quantity of component vectors in a single polarization direction, M=RL, and L indicates a quantity of precoding vectors of the precoding matrix in the single polarization direction; and the matrix is a block diagonal matrix, wherein each block is an X*L submatrix.

12. The transmit end device according to claim 9, wherein a matrix comprising the superposition coefficients of the component vectors for constructing the precoding matrix is an RX*RL matrix, where R indicates a quantity of polarization directions, X indicates a quantity of component vectors in a single polarization direction, M=RL, and L indicates a quantity of precoding vectors of the precoding matrix in the single polarization direction; and the matrix is a non-block diagonal matrix.

* * * * *

UNITED STATES PATENT AND TRADEMARK OFFICE
CERTIFICATE OF CORRECTION

PATENT NO. : 11,146,317 B2
APPLICATION NO. : 16/810750
DATED : October 12, 2021
INVENTOR(S) : Huangping Jin et al.

It is certified that error appears in the above-identified patent and that said Letters Patent is hereby corrected as shown below:

In the Specification

Column 11, Lines 13-26 should be replaced with:
$P$ indicates the precoding vector in the second precoding matrix. $W^{A-WB}$ indicates a matrix, namely, the first precoding matrix, including precoding vectors in a single polarization direction and indicated in feedback information in the first-stage CSI feedback mode. $W_1^{B-SB}$ indicates a matrix of the $l^{th}$ precoding vector selected from the first precoding matrix. $l$ may be any value in 0 to L–1. $e_l = [0 \;\cdots\; 1 \;\cdots\; 0]^T$. $e_l$ indicates an L*1 vector in which an $l^{th}$ element is 1, and other elements are all 0. A precoding vector selected based on $e_l$ is a precoding vector indicated in feedback information in the second-stage CSI feedback mode. $W_2^{B-SB}$ indicates a coefficient of the $l^{th}$ precoding vector, for example, may be the polarization phase difference $\phi$.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*